Sept. 28, 1937.  J. T. BRUBAKER  2,094,254

PACKING FOR INTERNAL COMBUSTION ENGINE CYLINDERS

Filed April 14, 1934  2 Sheets-Sheet 1

INVENTOR.
John T. Brubaker
BY
O. M. Cearke
ATTORNEY.

Sept. 28, 1937.   J. T. BRUBAKER   2,094,254
PACKING FOR INTERNAL COMBUSTION ENGINE CYLINDERS
Filed April 14, 1934   2 Sheets-Sheet 2
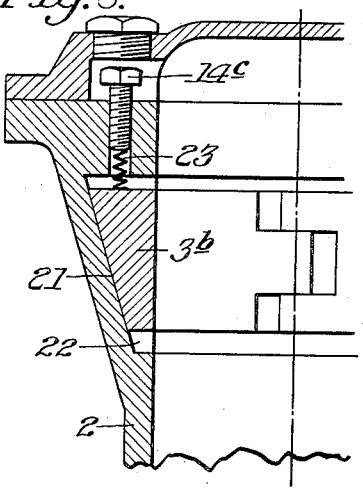
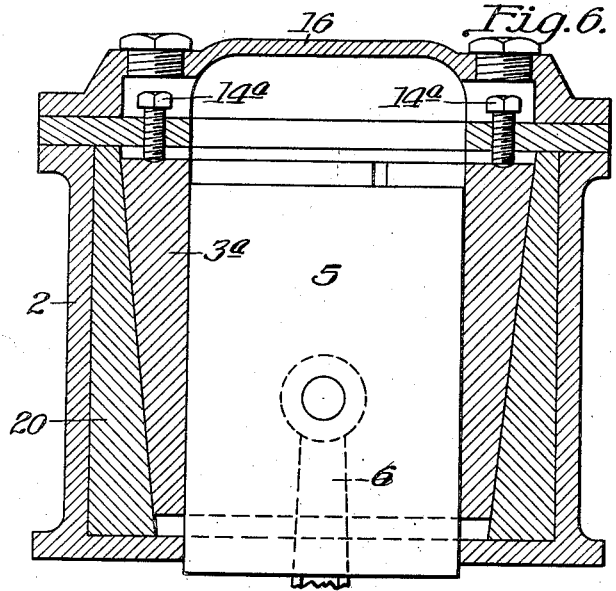
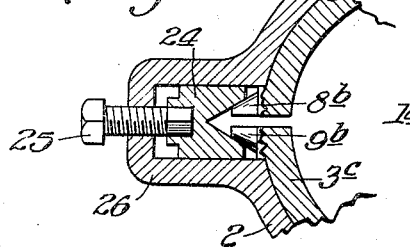
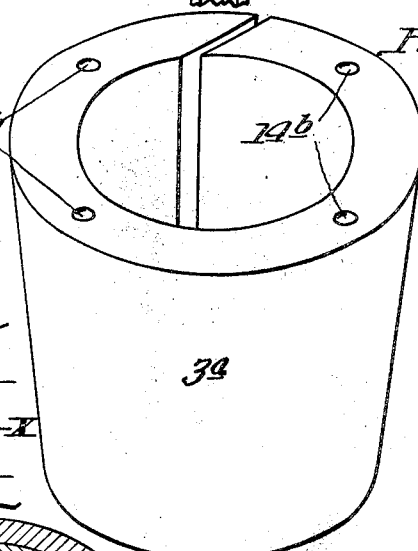
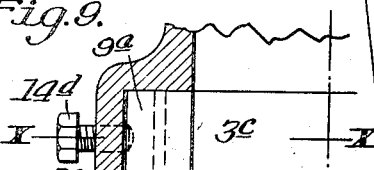
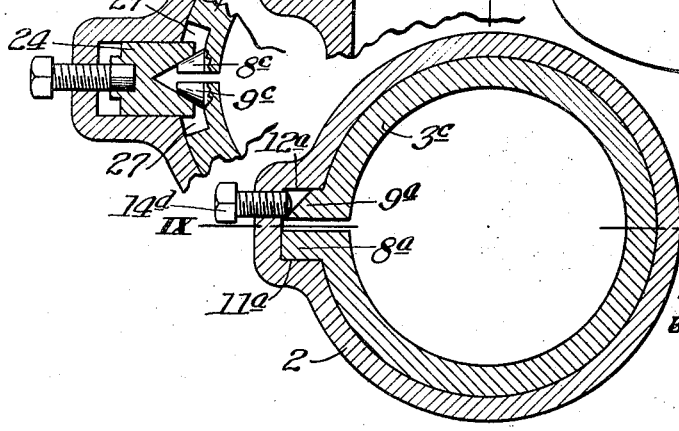
INVENTOR.
John T. Brubaker
BY
ATTORNEY.

Patented Sept. 28, 1937

2,094,254

UNITED STATES PATENT OFFICE 2,094,254

PACKING FOR INTERNAL COMBUSTION ENGINE CYLINDERS

John T. Brubaker, Wilkinsburg, Pa.

Application April 14, 1934, Serial No. 720,610

14 Claims. (Cl. 309—3)

My invention relates to the art of internal combustion engines, or the like, and has for its object to provide means for maintaining an operating closing contact between the piston or plunger and the cylinder wall, or a sealing portion thereof.

Ordinarily the usual split resilient packing rings usually employed are mounted upon and move with the piston, in reciprocation within the cylinder. Due to wear such rings deteriorate, lose their resiliency, and require replacement from time to time.

In my present invention the piston is merely cylindrical, without rings, and the compensation for wear is by means in the form of an embracing split ring or sleeve, mounted in the cylinder wall. Means are also provided for closing the ring inwardly, by slight but effective regulated movement, to maintain sufficiently tight engagement with the piston at all times.

Certain preferred constructions, all operating on the same general principle, are shown in the accompanying drawings, in which:

Fig. 6 is a vertical sectional view showing a modified construction, utilizing longitudinal adjustment of the sleeve;

Fig. 7 is a perspective view showing the split tapered sleeve, detached;

Fig. 8 is a partial similar view showing a further modification;

Fig. 9 is a vertical sectional view showing a still further modified construction, on the line IX—IX of Fig. 10;

Fig. 10 is a cross section on the line X—X of Fig. 9;

Fig. 11 is a sectional detail view showing a cone adjustment for equal tension on the sleeve terminals;

Fig. 12 is a partial similar view, showing a modified construction.

Figure 1:
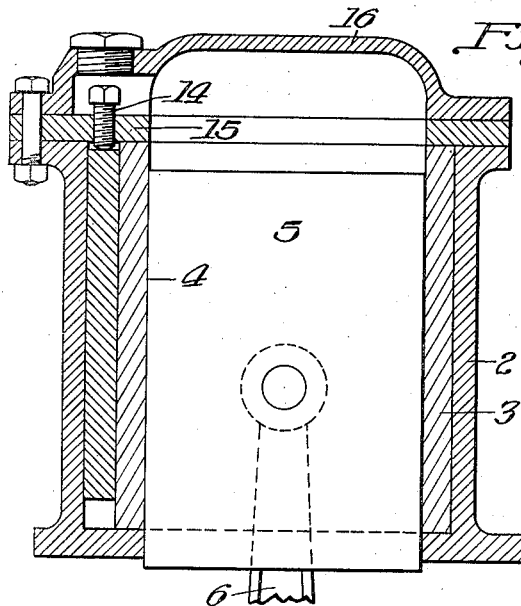
Fig. 1 is a vertical sectional view of a cylinder on the line I—I of Fig. 2.

The engine, of single or multiple cylinder construction, is provided with the main cylinder casing 2 suitably mounted on or incorporated with a base of suitable design, and provided with the usual several accompanying parts and co-operating elements, not shown. Within the cylinder is a split shell, sleeve or ring 3, the inner cylindrical face 4 of which is in embracing engagement with the piston or plunger 5 connected by the usual pitman 6 with the crank of the main shaft. Ring 3 is divided longitudinally as at 7 and is provided with laterally extending lugs or abutments 8 and 9.

The cylinder wall is extended laterally, providing clearance therefor and for the actuating wedge 10, and has inner opposing shoulders 11 and 12, the latter being tapered downwardly to provide a cam face to engage the tapered or cam face 13 of wedge 10. The opposite edge of the wedge bears against lug 9 and tends to close the ring 3 by its inward movement. A set screw 14 threaded in an inwardly extending projection in the form of a mounting ring 15 or other suitable bearing of the cylinder, provides means for very exact and gradual adjustment of the wedge, and the cylinder is provided with a closing head 16 embodying the explosion chamber, ignition devices, etc.

Figure 3:
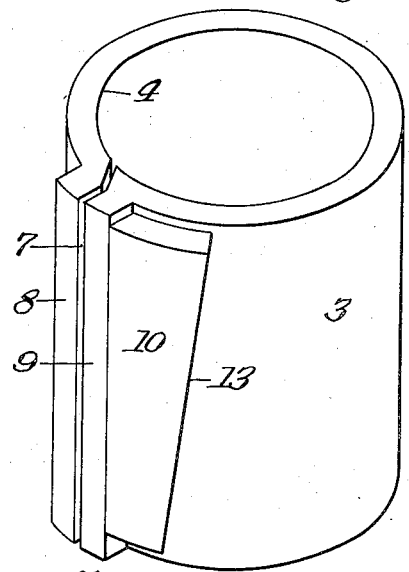
Fig. 3 is a perspective view showing the resilient embracing ring or sleeve detached, with the actuating wedge in position.
Figure 4:
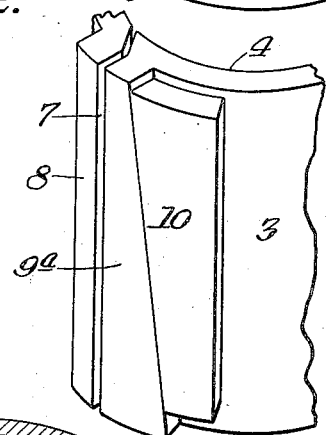
Fig. 4 is a partial similar view showing a modified arrangement of wedging faces.

In Fig. 4 I illustrate a modified construction in which the lug 9a is tapered and provided with an inclined face adapted to engage the inclined face of the wedge 10. In such arrangement the opposite edge of the wedge and the inner face 12 are parallel with the longitudinal axis of the cylinder. The closing action on the sleeve is the same as in Figs. 1, 2 and 3, and facilitates planing or machining of the faces.

Figure 5:
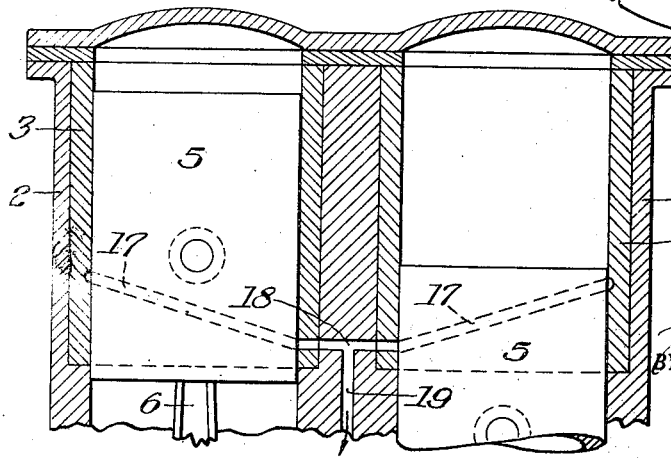
Fig. 5 is a vertical sectional view showing twin cylinders provided with lubricant circulating channels.

Fig. 5 shows twin cylinders in which similar rings or sleeves are provided with inner annular oil-collecting grooves 17, preferably inclined towards a common outlet port 18 extending through both rings and the middle cylinder wall, and leading through a downwardly extending outlet port 19 to the crank case.

By such arrangement surplus oil will be drained away from the piston or inner face of the cylinders, and returned to the common reservoir.

In the construction of Figs. 6 and 7 the split ring or casing 3a is tapered downwardly and seats within the interior tapered annular face of a surrounding bushing 20 mounted in the cylinder 2. The split ring in such case is itself a wedge, tending to close inwardly as it is adjusted downwardly by the action of a plurality of set screws 14a, mounted as in Fig. 1. Several such adjusting screws are preferably used for even pressure around the top of the ring, as indicated at 14b in Fig. 6.

In Fig. 8 the split ring 3b is annularly tapered downwardly and is mounted directly against a corresponding face 21 of the cylinder wall 2 as shown. The ring in such case may be of variable depth as desired, the receiving annular wedging face of the cylinder being of sufficient depth to provide ample adjusting clearance, as at 22. A series of temper screws 14c, either with or without springs 23, is located annularly of the inwardly extending projection shown at the top of cylinder 2, for desired downward adjustment of the ring as needed.

Figure 2:
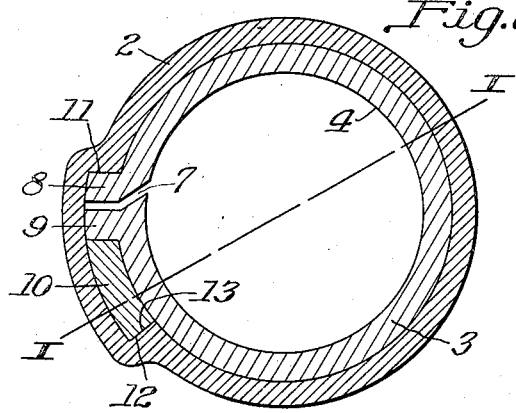
Fig. 2 is a transverse sectional view through the cylinder, sleeve and wedge of Fig. 1.

Figs. 9 and 10 show a further modified construction in which the ring 3c is somewhat like that of Fig. 2, having a holding lug 8a and an adjusting lug 9a, normally distended and bearing against abutment faces 11a and 12a of the cylinder wall. Lug 9a is provided with a beveled face against which bears the end of set screw 14d. By such means the screw will force one of the lugs towards the other, effecting compensation for wear of the ring 3c in the same general manner as in the other forms.

A modification of such adjustment is shown in Fig. 11 in which the lugs 8b, 9b, are in the form of half cones, embraced by a closing stud 24 having a cone-shaped socket engaging the lugs as shown. Stud 24 is in turning engagement, as by a squared socket, with the end of a temper screw 25 having threaded engagement with the outwardly extending casing 26 of cylinder wall 2.

Fig. 12 shows a further modification of the same general construction in which the half cone projections, lugs or abutments 8c and 9c are embodied in the normal thickness of the sleeve 3c and do not extend beyond its standard periphery. In such case the sleeve is recessed around the half cones, as at 27, providing clearance for the cone socket stud 24. By such construction I avoid any projections beyond the normal periphery of the sleeve, facilitating manufacture and installation.

With either of the constructions above described the closing in of the elastic ring around the piston is performed by the very simple expedient of utilizing pressure and wedging action, by simple and accurate means capable of very slight, gradual and accurate application. The different constructions are comparatively simple, cheap and effective, and capable of satisfactory and serviceable use under the conditions of internal combustion engine practice.

What I claim is:

1. In engine construction including a cylinder and piston, said cylinder having an interior face, means for packing the piston consisting of a surrounding divided sleeve member having an exterior face, one of said faces being a cam face, and means adjustably mounted in a wall of the cylinder engaging said faces operable for causing the sleeve to contract around the piston.

2. In engine construction including a cylinder and piston, means for packing the piston consisting of a resilient contractile annular sleeve between the piston and cylinder having an exterior face and a wedge means mounted in the cylinder engaging the sleeve and cylinder to effect wedging closure of the sleeve around the piston.

3. In engine construction, the combination with a cylinder and a piston therein, of an intervening resilient divided sleeve forming an inner cylinder wall and having lateral lugs, and wedging means engageable with and operable for causing the lugs to move toward each other.

4. In engine construction, the combination with a cylinder and a piston therein, of an intervening resilient divided sleeve forming an inner cylinder wall and having lateral lugs, an adjusting wedge engaging one of the lugs, and means for actuating the wedge.

5. In engine construction, the combination with a cylinder and a piston therein, of an intervening resilient divided sleeve having lateral lugs, an adjusting wedge engaging one of the lugs, and a temper screw mounted on the cylinder exerting pressure on the wedge.

6. In engine construction, the combination with a cylinder and a piston therein, of an intervening resilient divided sleeve having cone faced lugs, a cone socket engaging said lugs, and means for advancing the socket to effect closing of the lugs together.

7. In engine construction, the combination with a cylinder and a piston therein, of an intervening resilient divided sleeve having an outer tapered face, a wedging member between the cylinder and sleeve having a conforming tapered face, a cylinder head having access openings therethrough, and means effecting longitudinal movement of the sleeve to effect its closure around the piston, said means being accessible through said openings.

8. In engine construction, the combination with a cylinder, of a resilient divided sleeve within the cylinder coacting with the cylinder along a cam surface, a projection extending inwardly of the cylinder and across the sleeve, and means operable to contract the sleeve including a part mounted by said projection.

9. In engine construction, the combination with a cylinder, of a divided sleeve within the cylinder, a projection extending inwardly of the cylinder and across the sleeve, and means operable to contract the sleeve including a part mounted by said projection, and a cylinder head above said projection having an opening therethrough permitting access to said part.

10. In engine construction, the combination with a cylinder and piston, of an intervening divided sleeve, said cylinder having an enlargement providing a space between the same and said sleeve, and means in said space coacting with the sleeve to contract the sleeve about the piston.

11. In engine construction, the combination with a cylinder and piston, of an intervening divided sleeve, said cylinder having an enlargement providing a space between the same and said sleeve, and means in said space having an inclined surface coacting with the sleeve, and means movable axially of the cylinder to cause the first mentioned means to contract the sleeve about the piston.

12. In engine construction, a cylinder, a piston therein, said cylinder having a lateral extension providing an interior space leading outwardly from the main interior wall surface of the cylinder, a divided sleeve between the piston and said main interior wall, and wedging means in said space coacting with the divided sleeve and operable to contract said sleeve about the piston.

13. In engine construction, a cylinder, a divided sleeve means within the cylinder, and means within the cylinder abutting the sleeve means and coacting with the sleeve means along cam surfaces, and a part located substantially in line with one of said means operable to contract the sleeve.

14. In engine construction, a cylinder, a piston therein, a one-piece resilient, split sleeve disposed between said piston and cylinder normally having the edges at the split in spaced relation, and means between the cylinder and sleeve abutting the cylinder wall and adjacent structure and operable on an inclined plane to contract said sleeve.

JOHN T. BRUBAKER.